(12) United States Patent
Song et al.

(10) Patent No.: US 12,190,500 B2
(45) Date of Patent: Jan. 7, 2025

(54) DETECTING DEFECTS ON SPECIMENS

(71) Applicant: KLA Corporation, Milpitas, CA (US)

(72) Inventors: Chunwei Song, Shanghai (CN); Siqing Nie, Shanghai (CN); Weifeng Zhou, Shanghai (CN); Xiaochun Li, San Jose, CA (US); Sangbong Park, Danville, CA (US)

(73) Assignee: KLA Corp., Milpitas, CA (US)

( * ) Notice: Subject to any disclaimer, the term of this patent is extended or adjusted under 35 U.S.C. 154(b) by 138 days.

(21) Appl. No.: 18/178,519

(22) Filed: Mar. 5, 2023

(65) Prior Publication Data

US 2024/0296545 A1 Sep. 5, 2024

(51) Int. Cl.
*G06T 7/00* (2017.01)
*G06V 10/74* (2022.01)

(52) U.S. Cl.
CPC .............. *G06T 7/001* (2013.01); *G06V 10/74* (2022.01); *G06T 2207/10024* (2013.01); *G06T 2207/10061* (2013.01); *G06T 2207/20224* (2013.01); *G06T 2207/30148* (2013.01)

(58) Field of Classification Search
CPC ........... G06T 7/001; G06T 2207/10024; G06T 2207/10061; G06T 2207/20224; G06T 2207/30148; G06V 10/74
See application file for complete search history.

(56) References Cited

U.S. PATENT DOCUMENTS

| 8,126,255 | B2 | 2/2012 | Bhaskar et al. |
|---|---|---|---|
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 9,222,895 | B2 | 12/2015 | Duffy et al. |
| 2004/0247171 | A1 | 12/2004 | Hashimoto et al. |
| 2014/0212024 | A1* | 7/2014 | Chen .................. G01N 23/2251 382/149 |
| 2017/0140516 | A1 | 5/2017 | Maher et al. |
| 2017/0186144 | A1 | 6/2017 | Chien et al. |
| 2021/0256675 | A1* | 8/2021 | Nie .......... G06T 7/001 |
| 2021/0334989 | A1 | 10/2021 | Noormofidi et al. |
| 2023/0316478 | A1* | 10/2023 | Danen ...................... G06T 5/70 382/149 |

FOREIGN PATENT DOCUMENTS

| EP | 1768066 A1 * | 3/2007 |
|---|---|---|
| JP | 2021-148644 | 9/2021 |

OTHER PUBLICATIONS

International Search Report and Written Opinion for PCT/US2024/017364 mailed Jun. 7, 2024.

* cited by examiner

*Primary Examiner* — Samir A Ahmed
(74) *Attorney, Agent, or Firm* — Ann Marie Mewherter

(57) ABSTRACT

Methods and systems for detecting defects on a specimen are provided. One system computes different candidate reference images from different combinations of images of the specimen generated by an inspection subsystem and combines different portions of the candidate reference images without modification to thereby generate a final reference image. The final reference image is then used for defect detection, which may be single or double detection. The embodiments are particularly useful for defect detection in areas of specimens including only non-resolvable, repeating device patterns, like cell regions, but may be used for inspection of other types of areas as well.

20 Claims, 5 Drawing Sheets

DETECTING DEFECTS ON SPECIMENS

BACKGROUND OF THE INVENTION

1. Field of the Invention

The present invention generally relates to methods and systems for detecting defects on a specimen in the semiconductor arts.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Inspection using either optical or electron beam imaging is an important technique for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

In each processing step performed on a semiconductor wafer, the same circuit pattern is printed in each die. Most wafer inspection systems take advantage of this fact and use a relatively simple die-to-die comparison to detect defects on the wafer. However, the printed circuit in each die may include many areas of patterned features that repeat in the x or y direction such as the areas of DRAM, SRAM, or FLASH. This type of area is commonly referred to as an "array area" (the rest of the areas are called "random" or "logic areas"). To achieve better sensitivity, advanced inspection systems employ different strategies for inspecting the array areas and the random or logic areas.

Array detection algorithms are designed to achieve relatively high sensitivity for DRAM cell regions by making use of the repeatability of the cell region. For example, inspection systems configured for array area inspection often perform a cell-to-cell comparison where images for different cells in an array area in the same die are subtracted from one another and the differences are examined for defects. This array inspection strategy can achieve much higher sensitivity in array areas than random inspection (which is generally performed by subtracting an image for one die from an image for another die) because it avoids noise caused by die-to-die variation.

Many currently used array defect detection methods divide a whole care area into a few units, called cells. All the cells are put into independent groups, and each group is used to generate one single reference cell, which serves as the basis for the final reference image. Currently used array defect detection methods usually assume that all cells in each group are identical except for some random noise. The grayscale at the same location of all the cells just fluctuates around a noiseless ground truth. However, due to highly uneven reflectivity from different wafer regions, such uniform gray scale assumptions may not be always true. For example, relatively strong leakage from cell edge areas can introduce relatively low-frequency gray scale variation, which ultimately can cause relatively low inspection sensitivity. Besides, currently used array detection methods take each care area as a single detection area. By bundling different locations together, a good balance between sensitivity and nuisance control cannot be achieved. With a setting under which best sensitivity can be achieved from the inner area, there may be a huge number of nuisances from the edge/corner area.

Arbitrating the results of two detections has shown better performance in random defect detection algorithms than relying solely on single detection. This double-detection capability will also benefit array defect detection methods for nuisance reduction, but it is not used in currently used array defect detection methods.

Accordingly, it would be advantageous to develop systems and methods for inspection of specimens that do not have one or more of the disadvantages described above.

SUMMARY OF THE INVENTION

The following description of various embodiments is not to be construed in any way as limiting the subject matter of the appended claims.

One embodiment relates to a system configured for detecting defects on a specimen. The system includes an inspection subsystem configured for generating images for a specimen including a test image and two or more other images corresponding to the test image. The system also includes a computer subsystem configured for computing first and second candidate reference images from different combinations of at least two of the test image and the two or more other images. The computer subsystem is also configured for selecting at least a portion of the first candidate reference image corresponding to a first portion of the test image and a portion of the second candidate reference image corresponding to a second portion of the test image. In addition, the computer subsystem is configured for combining the selected portions of the first and second candidate reference images without modifying the selected portions of the first and second candidate reference images to thereby generate a final reference image. The computer subsystem is further configured for generating a difference image by comparing the test image to the final reference image and detecting defects in the test image by applying a defect detection method to the difference image. The system may be further configured as described herein.

Another embodiment relates to a computer-implemented method for detecting defects on a specimen. The method includes acquiring images for a specimen generated by an inspection subsystem including a test image and two or more other images corresponding to the test image. The method also includes the computing, selecting, combining, generating, and detecting steps described above. The acquiring, computing, selecting, combining, generating, and detecting are performed by a computer subsystem coupled to the inspection subsystem. Each of the steps of the method described above may be performed as described further herein. In addition, the embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF DRAWINGS

Further advantages of the present invention will become apparent to those skilled in the art with the benefit of the following detailed description of the preferred embodiments and upon reference to the accompanying drawings in which.

Figure 1:
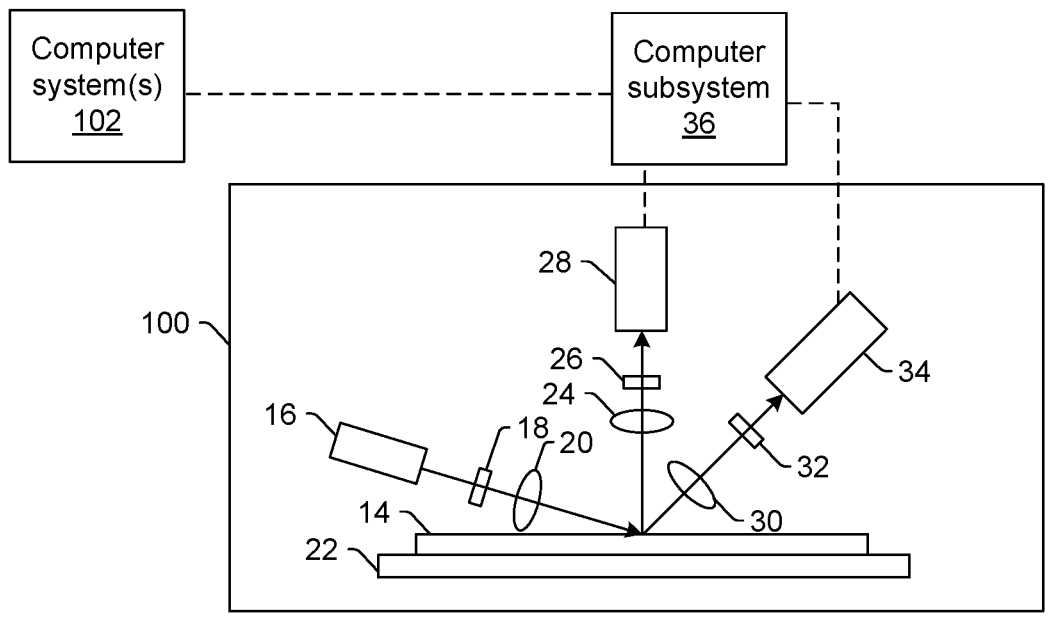
FIGS. 1 and 1A are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for detecting defects on a specimen. The embodiments described herein provide new reference image generation and detection methods that are particularly useful for non-pattern detection areas. Currently used methods for defect detection in non-pattern array (NPA) areas assume that the whole inspection region has uniform grayscale and only wafer/imaging noise causes gray level fluctuations. But the existence of color variation due to different material and structure reflectiveness breaks this assumption. Failure to properly handle color variation can lead to additional noise, which is sometimes even larger than defect of interest (DOI) signals, and reduce NPA defect detection sensitivity. Based on these observations, the steps described further herein are proposed to improve defect detection performance at non-pattern regions.

"Nuisances" (which is sometimes used interchangeably with "nuisance defects") as that term is used herein is generally defined as events that are detected on a specimen but are not really actual defects on the specimen. Nuisances that are not actually defects may be detected as events due to non-defect noise sources on a specimen (e.g., grain in metal lines on the specimen, signals from underlying layers or materials on the specimen, line edge roughness (LER), relatively small critical dimension (CD) variation in patterned features, thickness variations, etc.) and/or due to marginalities in the inspection system itself or its configuration used for inspection.

The terms "first" and "second" are used herein only for ease of referring to different things, but those terms are not meant to have any other connotation for the embodiments described herein.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for detecting defects on a specimen is shown in FIG. 1. The system includes inspection subsystem 100. In the embodiment shown in FIG. 1, the inspection subsystem is configured as a light-based inspection subsystem. However, in other embodiments described herein, the inspection subsystem is configured as an electron beam or charged particle beam based inspection subsystem. In general, the inspection subsystems described herein include at least an energy source and a detector. The energy source is configured to generate energy that is directed to a specimen. The detector is configured to detect energy from the specimen and to generate output responsive to the detected energy.

In a light-based inspection subsystem, the energy directed to the specimen includes light, and the energy detected from the specimen includes light. For example, in the embodiment of the system shown in FIG. 1, the inspection subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence.

The inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

The illumination subsystem may include only one light source (e.g., source 16 shown in FIG. 1) and light from the light source may be separated into different optical paths (e.g., based on wavelength, polarization, etc.) by optical element(s) (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing the light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength(s) known in the art. In addition, the laser may be configured to generate light that is monochromatic or nearly-monochromatic. For example, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to change the position on the specimen to which the light is directed and from which the light is detected and possibly to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection subsystem may be configured such that one or more optical elements of the inspection subsystem perform some scanning of the light over the specimen such that the light can be directed to and detected from different positions on the specimen. The light may be scanned over the specimen in any suitable fashion such as in a serpentine-like path or in a spiral path.

The inspection subsystem further includes one or more detection channels. At least one of the detection channel(s) includes a detector configured to detect light from the specimen due to illumination of the specimen by the system and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

The inspection subsystem may include a different number of detection channels (e.g., only one detection channel or two or more detection channels) than that shown in FIG. 1. In one such instance, the detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem may be configured to detect scattered light. Therefore, the inspection subsystem shown in FIG. 1 may be configured for dark field (DF) inspection of specimens. However, the inspection subsystem may also or alternatively include detection channel(s) that are configured for bright field (BF) inspection of specimens. In other words, the inspection subsystem may include at least one detection channel that is configured to detect light specularly reflected from the specimen. Therefore, the inspection subsystems described herein may be configured for only DF, only BF, or both DF and BF inspection. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 that forms part of an inspection system with the inspection subsystem may be configured to generate images of the specimen from the non-imaging output of the detectors. However, in other instances, the detectors may be configured as imaging detectors that are configured to generate imaging signals or image data. Therefore, the inspection subsystem may be configured to generate images in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the 29xx/39xx series of tools that are commercially available from KLA Corp., Milpitas, Calif. For some such systems, the methods described herein may be provided as optional functionality of the inspection system (e.g., in addition to other functionality of the inspection system). Alternatively, the inspection system described herein may be designed "from scratch" to provide a completely new inspection system.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. The computer subsystem coupled to the inspection subsystem may be further configured as described herein.

The computer subsystem coupled to the inspection subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a stand-alone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, in another embodiment, the inspection subsystem is configured as an electron beam based inspection subsystem. In an electron beam type inspection subsystem, the energy directed to the specimen includes electrons, and the energy detected from the specimen includes electrons. In one such embodiment shown in FIG. 1A, the inspection subsystem includes electron column 122, and the system includes computer subsystem 124 coupled to the inspection subsystem. Computer subsystem 124 may be configured as described above. In addition, such an inspection subsystem may be coupled to another one or more computer subsystems in the same manner described above and shown in FIG. 1.

Figure 1A:
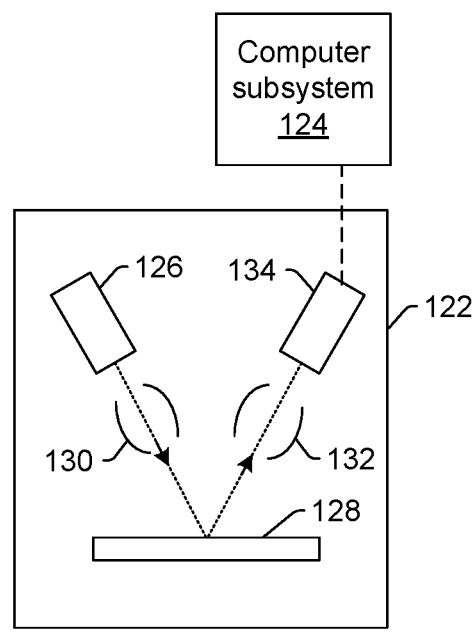

As also shown in FIG. 1A, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1A as being configured such that the electrons are directed to the specimen at an oblique angle of incidence and are scattered from the specimen at another oblique angle, the electron beam may be directed to and scattered from the specimen at any suitable angles. In addition, the electron beam inspection subsystem may be configured to use multiple modes to generate output for the specimen as described further herein (e.g., with different illumination angles, collection angles, etc.). The multiple modes of the electron beam inspection subsystem may be different in any output generation parameters of the inspection subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the inspection subsystem shown in FIG. 1A may be further configured as described herein.

FIG. 1A is provided herein to generally illustrate a configuration of an electron beam inspection subsystem that may be included in the embodiments described herein. As with the optical inspection subsystem described above, the electron beam inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light or electron beam inspection subsystem, the inspection subsystem may be an ion beam inspection subsystem. Such an inspection subsystem may be configured as shown in FIG. 1A except that the electron beam source may be replaced with any suitable ion beam source known in the art. In addition, the inspection subsystem may include any other suitable ion beam system such as those included in commercially available focused ion beam (FIB) systems, helium ion microscopy (HIM) systems, and secondary ion mass spectroscopy (SIMS) systems.

The inspection subsystems described herein may be configured to generate output, e.g., images, of the specimen with multiple modes. In general, a "mode" is defined by the values of parameters of the inspection subsystem used for generating output and/or images of a specimen (or the output used to generate images of the specimen). Therefore, modes may be different in the values for at least one of the parameters of the inspection subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc. for different modes). In another example, different modes may use different illumination channels of the optical subsystem. For example, as noted above, the optical subsystem may include more than one illumination channel. As such, different illumination channels may be used for different modes. The modes may also or alternatively be different in one or more collection/detection parameters of the optical subsystem. The modes may be different in any one or more alterable parameters (e.g., illumination polarization(s), angle(s), wavelength(s), etc., detection polarization(s), angle(s), wavelength(s), etc.) of the inspection subsystem. The inspection subsystem may be configured to scan the specimen with the different modes in the same scan or different scans, e.g., depending on the capability of using multiple modes to scan the specimen at the same time.

In a similar manner, the output generated by the electron beam subsystem may include output, e.g., images, generated by the electron beam subsystem with two or more different values of a parameter of the electron beam subsystem. The multiple modes of the electron beam subsystem can be defined by the values of parameters of the electron beam subsystem used for generating output and/or images for a specimen. Therefore, modes may be different in the values for at least one of the electron beam parameters of the electron beam subsystem. For example, different modes may use different angles of incidence for illumination.

As noted above, the inspection subsystem is configured for scanning energy (e.g., light, electrons, etc.) over a physical version of the specimen thereby generating output for the physical version of the specimen. In this manner, the inspection subsystem may be configured as an "actual" subsystem, rather than a "virtual" subsystem. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

Non-pattern array (NPA) reference generation is an important part of array inspection. NPA inspection methods are used to perform array inspection for highly repeating but non-resolvable pattern areas. So, for an NPA inspection, there is no pattern in the optical (or other) image. One issue that affects NPA inspection sensitivity is color variation (CV). CV may be manifested in relatively low-frequency grayscale variation of the input NPA image, especially near the corner or edge area. CV presents a significant challenge to NPA inspection. Relatively high numbers of nuisances are another significant challenge for NPA inspection. The embodiments described herein offer a new method to address both of the above challenges, via a new reference generation method to handle CV and a new detection strategy to suppress nuisances.

Figure 2:
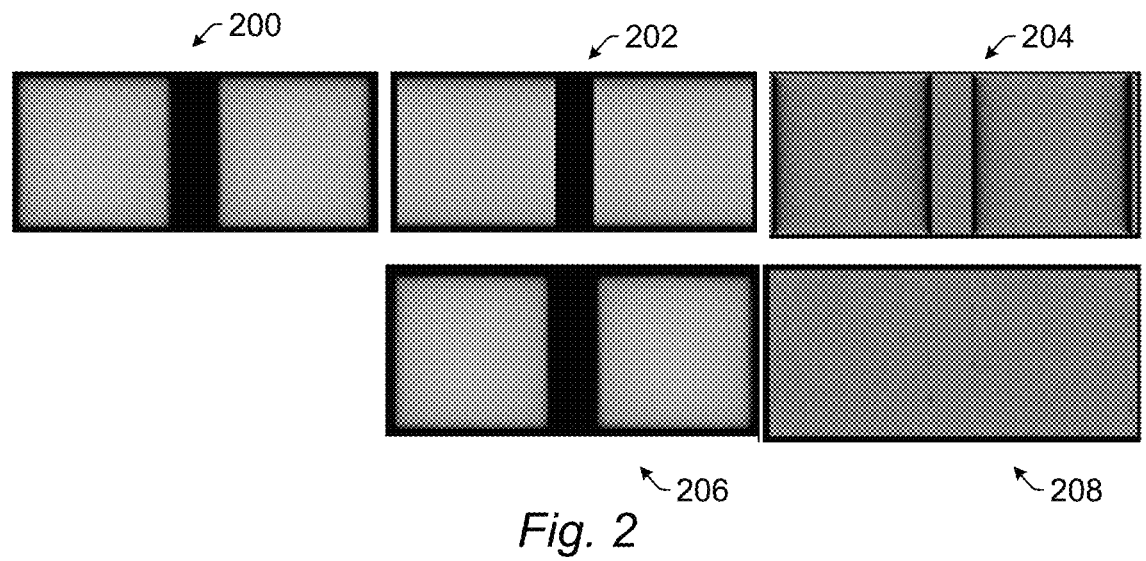
FIG. 2 is a schematic diagram illustrating a plan view of one example of a test image, a corresponding reference image, and a difference image generated therefrom with a currently used inspection method and an embodiment of a final reference image generated as described herein and a difference image generated therefrom.

FIG. 2 illustrates these challenges and how the embodiments described herein are designed to overcome them. In this figure, image 200 is a test image generated for a specimen by an optical inspection subsystem such as that described herein. Reference image 202 is a reference image generated by a currently used method for NPA defect detection, and difference image 204 is generated by subtracting reference image 202 from test image 200. As can be seen by comparing reference image 202 to test image 200, reference image 202 is much quieter near the left and right edges of the cell regions in the reference image (the lighter areas in the reference image) than near the same edges in the test image. These differences between the test and reference images can occur when, for instance, the test image contains noise in some areas like near edges and the reference image generation fails to take such noise into consideration.

These differences between the reference image and test image show up in the difference image as the darker areas located close to the left and right edges of the cell regions in the difference image. These noise differences between the reference and test images may then be detected erroneously as defects when a defect detection method is applied to such a difference image. If the defect detection threshold is increased to avoid detection of this noise, DOIs present in the test image may go undetected. Both of these situations are disadvantageous for a number of obvious reasons.

In contrast, reference image 206 illustrates an embodiment of a reference image that may be generated by the embodiments described herein. Difference image 208 is generated by subtracting reference image 206 from test image 200. As can be seen by comparing reference image 206 to test image 200, reference image 206 and test image 200 contain similar noise near the left and right edges of the cell regions (the lighter areas) in the test image. These similarities in noise characteristics are made possible because the reference generation described herein is performed in such a way that the noise in the test image can be much better replicated in the reference image, which thereby results in a much quieter difference image as can be seen by comparing difference image 208 to difference image 204. As a result, defect detection performed on difference image 204 and difference image 208 with the same parameters (e.g., threshold) will not detect as many nuisances in difference image 208 compared to difference image 204. In addition, due to the relatively quiet nature of difference image 208, a more sensitive inspection may be performed on difference image 208 without detecting a prohibitive number of nuisances while also detecting more DOI including those with relatively weak signals.

One embodiment of a system configured for detecting defects on a specimen includes an inspection subsystem configured for generating images for a specimen, which may include any of the inspection subsystems described herein. The images include, but are not limited to, a test image and two or more other images corresponding to the test image. The test image and the two or more other images may be generated in areas on the specimen including only non-resolvable, repeating device patterns. In other words, the images that are used in the embodiments described herein do not contain images of device patterns formed in areas of the specimen in which the images are generated. In one such example, test image 200 is an image of two cell regions on a specimen that contain patterned features formed therein, but none of the patterned features are resolved in this image. Although the embodiments described herein are particularly suitable and advantageous for NPA inspection, the embodiments may also be used for inspection performed with images in which patterned features are resolved.

The terms "image" and "image frame" are used interchangeably herein. In general, an "image frame" is defined as a collection of pixels in an image that are processed collectively for a purpose such as defect detection. The size of the image or image frame may therefore vary depending on certain characteristics of the inspection subsystem or the computer subsystem. In some inspection use cases, an image may actually be composed of multiple image frames, but the embodiments described herein are not inherently limited in the size of the images that can be processed.

A "job" as that term is used herein is defined as a number of image frames that are collectively processed by the computer subsystem for detecting defects on the specimen. Typically, the entirety of the images that are generated during an inspection process cannot be processed all together (e.g., even if it is possible, it is not typically time or cost efficient). Therefore, the entirety of the images are separated into jobs of image frames that can be processed collectively for defect detection in a more inexpensive and timely manner.

Acquiring the images may include generating the images with an inspection subsystem configured as described herein. This image acquisition may be done when the computer subsystem and the inspection subsystem are coupled in one tool and possibly when the defect detection described herein is being performed on-tool and/or as the images are being generated. In other instances, the computer subsystem may acquire the images from another method, system, or storage medium. For example, the computer subsystem and the inspection subsystem may or may not be coupled into a single tool, and the inspection subsystem, the computer subsystem, or another computer subsystem may store the images generated by the inspection subsystem. The computer subsystem may then acquire the images from the storage medium in which they are stored. This image acquisition may be done when the computer subsystem performs the steps described herein off-tool and/or after all (or at least some) of the images have been generated. Each of the elements described above may be configured as described and shown further herein.

In one embodiment, the computer subsystem is configured for dividing the images corresponding to a care area on the specimen into the test image corresponding to a test cell and the two or more other images corresponding to two or more other cells neighboring the test cell. Each care area may be divided into many cells, like currently used NPA defect detection methods. But instead of putting all the cells into some non-overlapping groups like currently used methods and systems, the computer subsystem may form a group for each cell that includes a few neighboring cells. Grouping the cells in this manner may be performed to provide a CV compensation method for NPA reference generation. By reorganizing cell grouping, a cleaner difference image can be achieved.

Figure 3:
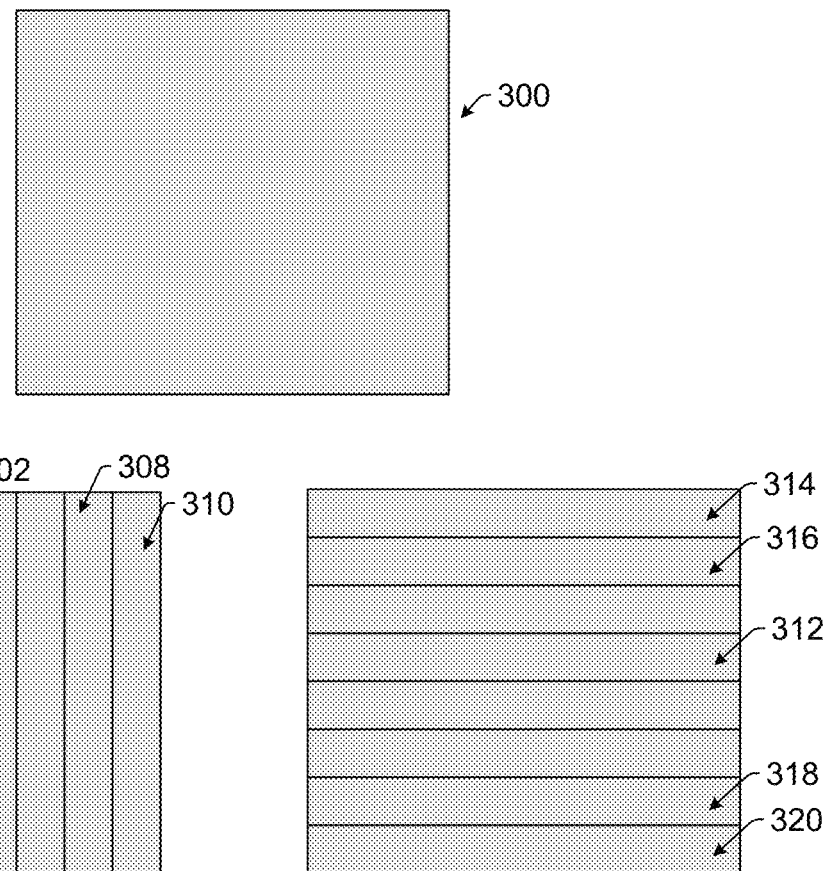
FIG. 3 is a schematic diagram illustrating a plan view of one example of an image generated for a specimen and different embodiments for dividing the image into a test cell and two or more other cells neighboring the test cell.

FIG. 3 illustrates one example of an image for a care area and different embodiments of dividing the care area image into the test image for a test cell and other images corresponding to other cells neighboring the test cell. In particular, image 300 is a hypothetical image for a care area. While this image is simply a single grayscale value image and is therefore not really representative of an image that might be generated by an inspection subsystem configured as described herein, it is accurately representative of an NPA image in that none of the patterned device features formed on the specimen in the care area are resolvable in the image. There may be multiple instances of the same care area on a specimen, and image 300 represents an image for only one such instance.

Each care area may be equally divided into a few cells only along the horizontal or vertical direction. As shown in FIG. 3, if the care area is divided along the horizontal direction, then a test cell image could be image portion 302 and the other cell images neighboring the test cell could be image portions 304, 306, 308, and 310. If the care area is divided along the vertical direction, then a test cell image could be image portion 312 and the other cell images neighboring the test cell could be image portions 314, 316, 318, and 320. In this manner, the neighboring cells are the cells to the left and/or right of one target cell (if the care area is divided along the horizontal direction) or top and/or bottom of the target cell (if the care area is divided along the vertical direction). The computer subsystem may form a group of neighboring cells for each test cell target. In other words, if inspection is being performed for a test cell corresponding to image portion 304, a group of image portions different than that described above may be selected as cells neighboring that test cell.

As shown in FIG. 3, therefore, cells neighboring a test cell do not have to be adjacent to the test cell and can be spaced from the test cell by one or more other cells. However, cells that are adjacent to a test cell may be selected as neighboring cells. In addition, cells neighboring a test cell can include cells on both sides of the test cell, but this is also not required. Furthermore, although the number of cells neighboring a test cell are shown in FIG. 3 to be four cells, the number of neighboring cells may also vary greatly and depend on a number of factors such as how much the color variation changes from cell-to-cell, a practical amount of image data that can be handled simultaneously by the computer subsystem, etc. Different numbers of neighboring cells may also be selected for cells in the horizontal and vertical directions. The same care area image may also be divided along the horizontal and vertical directions, and the resulting test cells may be separately processed. For example, reference generation and defect detection may be performed for test cell 302 and its neighboring cells 304, 306, 308, and 310, and reference generation and defect detection may also be separately performed for test cell 312 and its neighboring cells 314, 316, 318, and 320.

In some embodiments, prior to computing first and second candidate reference images as described further herein, the computer subsystem is configured for applying a CV compensation to the test image and the two or more other images. For example, the first step may be to add CV compensation to the reference generation process. One CV compensation may be applied to all the cells in one group before creating a reference cell. For example, CV compensation may be applied to cells 304, 306, 308, and 310 before they are used to generate a reference cell image. After this step, CV is inherently integrated into the reference image that is ultimately subtracted from the test image, which thereby produces a cleaner final difference image. In this manner, the embodiments described herein provide a CV compensation method for NPA reference generation. By reorganizing cell grouping and compensating for CV, a cleaner difference image is achieved.

CV can cause each cell to have different gray levels, which unless compensated for will limit the cell-based noise removal capability. One particularly suitable way to do CV compensation is to assume the gray level in one cell as a variable $x_i$. A special function $f(x_i|p_1, p_2, \ldots)$ may then be created with a few unknown parameters $p_n$. This function may be applied to each pixel location. Parameters can be calculated for each cell by minimizing the difference between the target cell and the cell after function operation $\|x_t - f(x_i|p_1, p_2, \ldots)\|$. Applying this function to the corresponding cell will compensate CV. In this manner, the computer subsystem may fit the gray scale change within each cell. The base fitting function may be, for example, segmented linear. After the fitting is done, the fitted result $f(x_i|p_1, p_2, \ldots)$ becomes the local reference image within each cell. Since the fitted reference image follows with the test image substantially well, the CV embedded into the raw test image is removed or reduced significantly.

As mentioned above, CV is integrated into the reference cell image. One reason for this is the CV compensation described above. In particular, the purpose of the better reference generation described herein is to obtain a cleaner difference image. In the past, CV compensation could not be or was not performed, which means that CV will remain in the difference image and can make the difference image too noisy for defect detection. But by performing CV compensation on the images used to generate the reference image, the CV compensation is integrated into any reference image generated therefrom which can then be used to generate a cleaner difference image. In other words, the CV is inherently handled in the reference image generation process. In this way, the CV in the reference image will compensate the CV in the test image. The CV compensation can be inherently integrated into the reference generation for all of the reference images generated as described herein.

The embodiments described herein generate multiple candidate reference images for each test image and mix them together as described further herein to further boost CV handling capability. The computer subsystem is configured for computing first and second candidate reference images from different combinations of at least two of the test image and the two or more other images. For example, as shown in step 400 of FIG. 4, the computer subsystem may compute candidate reference images. Computing any of the candidate reference images described herein may be performed by combining two or more of the images using, for example, a linear combination, a median operation, an averaging operation, another currently used method for generating a computed reference (CR), etc. In this manner, computing a candidate reference image from two or more images may result in an image that has different characteristics than one or more of the input images. In other words, pixels in the computed candidate reference image may have different image characteristics such as grayscale values than corresponding pixels in each of the images used to generate the computed candidate reference image. The candidate reference image generation is therefore fundamentally different than the final reference image generation described further herein.

In most instances, two or more candidate reference images may be computed for each test image. In other words, the candidate reference images may not be used for more than one test image in a job. Instead, after grouping images as described further herein, for each test image within each job, the computer subsystem will create at least two candidate reference images. However, in other instances it may be possible to reuse candidate reference images for more than one test image.

In one embodiment, a first of the different combinations of the at least two of the test image and the two or more other images used to compute the first candidate reference image includes a portion of the images generated in only the x-direction across the specimen. In another such embodiment, a second of the different combinations of the at least two of the test image and the two or more other images used to compute the second candidate reference image includes an additional portion of the images generated in only the y-direction across the specimen. Currently used NPA defect detection methods always generate a reference in a row-independent way (i.e., using the images generated along the x-direction to generate a reference). The embodiments described herein may also adopt the same strategy to form one candidate reference image. In addition, a similar operation may also be applied in a column-independent way to generate another candidate reference image (i.e., using the images generated along the y-direction to generate a candidate reference image). Generating two such candidate reference images provides a number of significant advantages described further herein.

Figure 5:
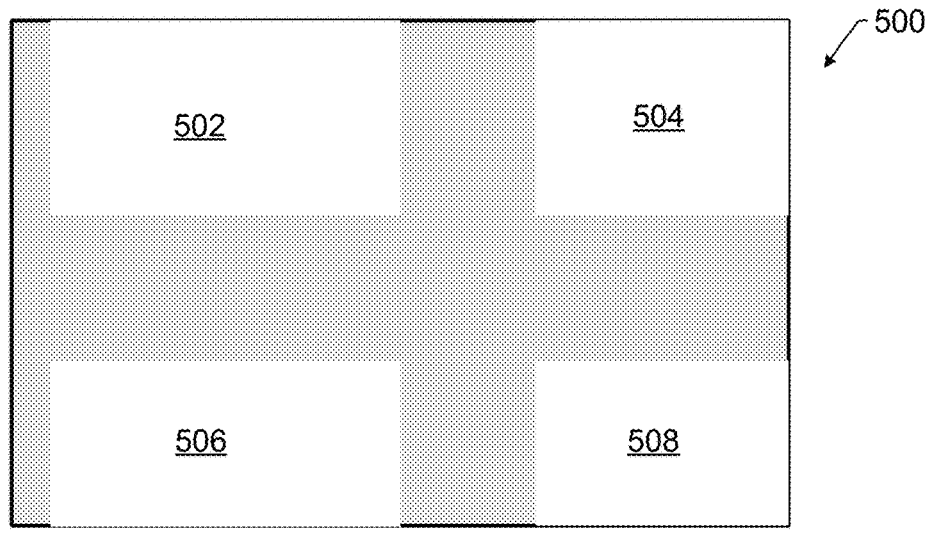
FIG. 5 is a schematic diagram illustrating a plan view of one example of a job that includes image frames for different cell regions on a specimen.

In a further embodiment, one of the different combinations of the at least two of the test image and the two or more other images used to compute one of the first and second candidate reference images includes all of the images generated in two or more dies on the specimen in a job of the images. For example, an additional reference may be generated by bringing all the dies into consideration. "All the dies" in this context means all the dies included in one job, which is the minimum unit for image processing. One job could include at most all the dies in one die row or at least three dies. FIG. 5 illustrates one example of a job that includes multiple cells regions for inspection. In particular, job 500 includes cell regions 502, 504, 506, and 508, each of which may be included in a different die on the specimen. In this embodiment, a candidate reference image may be generated from all of the images of all of the cell regions included in job 500.

In this manner, some of the candidate reference images may be generated from a single die (e.g., the row-independent and column-independent references) while one or more other candidate reference images may be generated from two or more die images (e.g., a candidate reference image generated from "all the dies"). In general, in the embodiments described herein, at least two candidate reference images are generated so that a final candidate reference image can be created from those two images. However, in many use cases, it will be advantageous to generate all three of the types of candidate reference images described herein, namely the row-independent, column-independent, and multi-die candidate reference images. Two or more of these candidate reference images may be used to generate a final reference image. One or more of these candidate reference images may also be used as a second or additional final reference image in instances when double detection is being performed. Such embodiments are described further herein.

In currently used NPA defect detection, reference generation happens within each individual frame. In other words, the reference generation for Frame 3 does not need any input from Frame 2 or Frame 4. In contrast, in the embodiments described herein, to generate a reference image for Frame 3, both Frame 3 and all other frames may be used. Using these images to generate a candidate reference image may be advantageous, for example, when a cell corner area has a unique gray scale value relative to the rest of the cell region. Such unique gray scale values can make it hard to find a good matching reference image for each corner within each cell region. However, it may be significantly easier to find a good match from other corners of other cell regions. By using all other frames in a job, better candidate reference images can be created and used to create a better final reference image.

The computer subsystem is also configured for selecting at least a portion of the first candidate reference image corresponding to a first portion of the test image and a portion of the second candidate reference image corresponding to a second portion of the test image. For example, as shown in step 402 of FIG. 4, the computer subsystem may be configured for selecting different portions of the candidate reference images corresponding to different portions of a test image. As described further herein, the embodiments are configured to provide a better reference image that can in turn be used to generate a better difference image, which thereby enables less nuisance detection and/or more sensitive inspection. To do that then, a better reference would be one that better matches the test image, particularly with respect to the noise in the test image. For example, if the noise in the reference image substantially matches the noise in the test image, then when the reference image is subtracted from the test image, that noise in the test image will be canceled out thereby preventing it from being detected as nuisances and/or interfering with the detection of DOIs. The goal of the selecting step is therefore to find the best matching reference image from a set of candidate reference images on a test image portion-by-test image portion basis, which may be performed in several ways described further herein.

Figure 6:
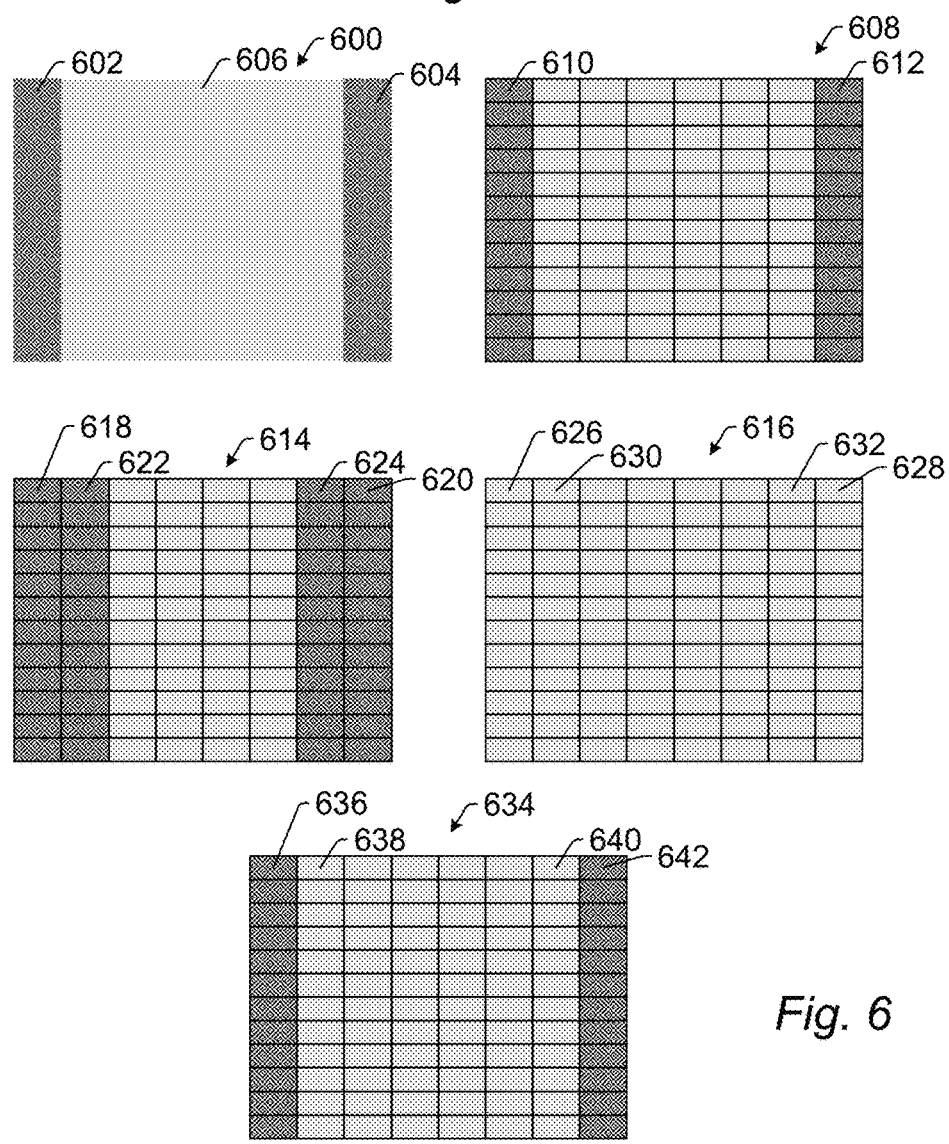
FIG. 6 is a schematic diagram illustrating a plan view of one embodiment of different candidate reference images in which different portions corresponding to different portions of a test image are selected and combined without modification to thereby generate a final reference image.

In one embodiment, the selecting includes identifying which portions of the first and second candidate reference images best match different portions of the test image. FIG. 6 shows one embodiment of how this may be performed. In this embodiment, test image 600 is an example of a test image that may be generated for a care area on a specimen. Like the test image shown in FIG. 2, this test image includes center portion 606 that is relatively quiet compared to portion 602 proximate the left edge and portion 604 proximate the right edge. These portions are relatively noisy compared to the center portion because of, for example, the color variation that may occur near the edges of the care area image. As described further above, if the reference image that is used with the test image for defect detection does not contain similar noise as the test image, that will cause problems for defect detection. Therefore, the new ways of reference image generation described herein were created.

The selecting step may include dividing the test image into an array of blocks as shown in image 608. Each of the blocks may have the same predetermined characteristics such as dimensions and are simply used to divide the image into smaller portions that can be evaluated on an individual basis as described further herein. The number of blocks into which an image is divided may vary, possibly greatly, and may be determined based on a number of factors such as initial image size and how quickly the noise varies across the image (when it varies relatively quickly, smaller blocks may be more appropriate to capture the different values of noise on the same or similar scale at which it changes).

As mentioned above, the portions of the candidate reference images that best match different portions of the test image may be identified by the computer subsystem, which means that the correspondence between test image portions and reference image portions can be relaxed even though each test image portion is individually processed. In other words, the portion of the candidate reference images that best matches a portion of a test image may not necessarily be restricted to only those portions of the candidate reference images that have the same within-image locations as the test image portion.

To illustrate this concept, consider two example candidate reference images 614 and 616, which may be any of the candidate reference images generated in any of the ways described herein. Each of these candidate reference images may be divided into blocks in the same manner as the test image, which is shown by the black lines overlaid on these images. The identifying step may begin with the test image block located in the upper row of column 610 of blocks. This test image block may be compared to each block in candidate reference image 614 to determine which of the blocks in this candidate reference image best match the test image block. The block of that candidate reference image that best matches the test image block may be saved, and then the same comparison step may be performed with candidate reference image 616 blocks to determine if an even better matching block is contained in that candidate reference image. The best matching block in either candidate reference image 614 or 616 may then be identified and saved for inclusion in the final reference image at the position of the test image block.

In this manner, for each test image block, all of the blocks in all (or at least some) of the candidate reference images may be considered to find the best matching image block. This same process may then be performed for the next block in the test image. In some instances, the same block of one of the candidate reference images may be identified as best matching for more than one test image block. By making it possible that any block in any of the candidate reference images can be used as the best matching block for a test image block, it may be possible to create a better reference image than if only the blocks at the same within-image locations are considered. This method may provide a better final reference image when the test image and each of the candidate reference images exhibit noise having substantially different spatial or other characteristics.

In another embodiment, the selecting includes identifying which portions of the first and second candidate reference images best match corresponding portions of the test image. In this manner, unlike the embodiment described above, for each test image block, only the candidate reference image blocks having the same within-image positions may be considered. This embodiment may be quicker than that described above because the number of blocks considered for any one test image block will be limited to the number of candidate reference images that have been generated. Unlike the embodiment described above, however, this embodiment will not be as flexible or exhaustive in the blocks that are considered and therefore may be better suited for instances in which it is known or expected that at least one of the candidate reference images contains noise having similar spatial and possibly other characteristics as the test image.

To illustrate this concept, image 608 which is test image 600 divided into blocks may be used again with candidate reference images 614 and 616. The identifying step may begin with the test image block located in the upper row of column 610 of blocks. This block may be compared to the image block located in the upper row of column 618 in candidate reference image 614 and the image block located in the upper row of column 626 in candidate reference image 616 to determine which of these blocks best matches the test image block. If no other candidate reference images have been generated for this test image, then no other candidate reference image blocks may be considered for this test image block. As shown by images 608, 614, and 616, the image block located in the upper row of column 618 of candidate reference image 614 is a much better match for the test image block located in the upper row of column 610 than the image block at the same position in candidate reference image 616. The best matching candidate reference image block identified by this step may then be saved for generating the final reference image as described further herein.

The identifying step may then proceed with the test block located in the second row from the top in column 610 of blocks. This block may be compared to the image block located in the second row from the top in column 618 in candidate reference image 614 and the image block located in the second row from the top in column 626 of candidate reference image 616 to determine which of these two blocks best matches the test image block. Again, if no other candidate reference images have been generated for this test image, then no other candidate reference image blocks may be considered for this test image block. As shown by images 608, 614, and 616, the image block located in the second from top row of column 618 of candidate reference image 614 is a better match for the test image block located in the second from top row of column 610 than the image block at the same position in candidate reference image 616. The best matching candidate reference image block identified by this step may also be saved for generating the final reference image as described further herein. The identifying step may proceed then for all of the remaining test blocks in image 608.

Regardless of which way the comparisons are performed for the images shown in FIG. 6, the different candidate reference images contain different noise than the test image. In particular, the noise at the left and right edges of candidate reference image 614 (shown by the darker portions of the image) extends farther into the candidate reference image than the noise at the left and right edges of the test image (also shown by the darker portions of the test image). In particular, columns 618, 620, 622, and 624 of blocks in candidate reference image 614 contain noise while only columns 610 and 612 of blocks in test image 608 contain noise. In contrast, candidate reference image 616 contains almost no noise at the left and right edges of this image (as shown by the lack of any relatively dark areas in the candidate reference image). In particular, columns 626 and 628 of candidate reference image 616 contain no or almost no noise while corresponding columns 610 and 612 of image 608 clearly contain noise. Therefore, if either candidate reference image is used for defect detection with the test image, either reference image can result in significant detection of nuisances or other problems for defect detection. However, by selectively identifying portions of the candidate reference images for inclusion in the final reference image based on how they match the test image, final reference image 634 may be generated that clearly contains noise that better matches test image 600.

The computer subsystem is further configured for combining the selected portions of the first and second candidate reference images without modifying the selected portions of the first and second candidate reference images to thereby generate a final reference image. As shown in step 404 of FIG. 4, the computer subsystem may combine the selected portions to generate a first final reference image, which may be the only final reference image in the case of single detection or one of two final reference images in the case of double detection. For example, final reference image 634 shown in FIG. 6 may be generated by combining the selected portions of first candidate reference image 614 and second candidate reference image 616 without modifying the selected portions of those images.

In particular, as shown in FIG. 6, for image blocks in column 610 of image 608, the image blocks in column 618 of candidate reference image 614 are a much better match than the image blocks in column 626 of candidate reference image 616. Therefore, the image blocks in column 636 of final reference image 634 may be the image blocks in column 618. In a similar manner, for image blocks in column 612 of image 608, the image blocks in column 620 of candidate reference image 614 are a much better match than the image blocks in column 628 of candidate reference image 616. As such, the image blocks in column 642 of final reference image 634 may be the image blocks in column 620.

In contrast, the image blocks in columns 622 and 624 of candidate reference image 614 do not match very well with the corresponding columns of image blocks in image 608. However, the image blocks in columns 630 and 632 of candidate reference image 616 are a much better match for the corresponding columns of image blocks in image 608. Therefore, these image blocks may be included in final reference image 634 as columns 638 and 640, respectively. The remaining four central columns of blocks in image 608 match very well with the four central columns of blocks in both candidate reference images. Therefore, the four central columns of blocks in either of the candidate reference images may be used as the four central columns of blocks in final reference image 634.

In this manner, mixing multiple candidate reference images together to create a final reference image may be block based. The images are cut into relatively small blocks. With each block, the test image is compared with each individual reference image. The reference image block that best matches with the test image block is selected for inclusion in the final reference image.

As described further above, the combining step is performed without modifying the selected portions of the first and second candidate reference images to thereby generate a final reference image. This reference image generation is therefore significantly different from other computed reference (CR) generation methods. In particular, the final reference image generation described herein can be thought of as a kind of "pick and place" operation in which once the different portions of the candidate reference images are identified and selected as described above, they are placed into the position of the portion of the test image they were selected for. The selected portions of the different candidate reference images can then kind of be "stitched together" into a final reference image. These steps are performed without modifying the images themselves however. In other words, in the actual combining of the images, the selected image portions are not modified.

In contrast, in currently used CR generation methods, combining two or more images to generate a CR involves combining the images in such a way that the resulting image data is different than that of the original images. For example, a linear combination operation may be used to generate a CR and therefore one or more pixels in the resulting CR may be different than the same one or more pixels in all of the images used to generate the CR. Such modification of at least some of the pixels of the images is in fact the point of currently used CR methods. In particular, the goal of currently used CR methods is usually to generate a reference image that is as quiet as possible so that it is basically a "defect free" image.

That aim is fundamentally different than the goal of the combining step described herein, which is to generate a final reference image that is as similar in noise to the test image as possible. This is illustrated by test image 600 in FIG. 6, which as described further herein contains relatively significant noise near the left and right edges of the image. If a significantly noise-free reference image such as candidate reference image 616 was used to generate a difference image for the test image, the noise at the left and right edges of test image 600 may be detected as defects. In contrast, final reference image 634 may be generated by the embodiments described herein and may contain relatively significant noise like the test image having the same or substantially the same characteristics. In this manner, this final reference image is definitely not noise-free but, when subtracted from the test image to generate a difference image, will result in a substantially quiet difference image that can be used to detect DOIs including those that have relatively low signal without detecting many nuisances. The embodiments described herein therefore generate final reference images that are fundamentally different than currently generated and used CRs, which provides significant advantages to the embodiments described herein.

Instead of mixing multiple candidate reference images together to generate a different final reference image as described above, the comparing steps described above may be performed on a test image portion-by-test image portion basis to determine which of the candidate reference images best matches the test image. In this manner, after the multiple candidate reference images have been generated for each test image, the best reference image can be selected from the multiple reference images. For example, in some instances unlike that shown in FIG. 6 in which portions of both candidate reference images definitely do not match well with corresponding portions of the test image, there may be situations in which one of the candidate reference images generated in one of the various ways described herein has noise characteristics that are substantially similar to the noise characteristics of the test image. In particular, if image 634 is a third candidate reference image rather than the final reference image as described above, then clearly image 634 substantially matches the noise characteristics of test image 600 much better than both of the other candidate reference images 614 and 616. Therefore, combining different portions of different candidate reference images may not be needed since a suitable final candidate reference image already exists in candidate reference image 634.

In some embodiments, the computer subsystem is configured for computing a third candidate reference image from the different combinations and selecting at least a portion of the third candidate reference image corresponding to a third portion of the test image, and the combining step includes combining the selected portions of the first, second, and third candidate reference images without modifying the selected portions of the first, second, and third candidate reference images to thereby generate the final reference image. For example, one final reference image may be constructed from three candidate reference images for each test image. One of the references may be generated in a row-independent way, another in a column-independent way, and the third by using more than one die thereby giving the resulting final reference image a three-dimensional (3D) nature. In this manner, the embodiments described herein may be referred to as 3DNPA. The three candidate reference image generation and merging approach described herein provides advantages for the embodiments described herein. For example, by generating three candidate reference images from row-independent, column-independent, and multiple die ways and then merging all three reference images, better noise reduction can be obtained. Other than using a greater number of candidate reference images, these steps may be performed as described above.

In one embodiment, subsequent to the combining step, the computer subsystem is configured for applying a color variation compensation to the results of the combining. For example, even though combining different portions of different candidate reference images into a final reference image does not, in of itself, involve modifying the selected portions of the different candidate reference images, one or more additional image processing steps may be performed on the final reference image before it is used for defect detection. As described above, CV compensation may be applied to the candidate reference images prior to the steps performed to generate a final reference image, which means that the generated final reference image will inherently have the same CV compensations. Therefore, performing an additional CV step on the final reference image may not be needed and whether or not this step is performed may be evaluated on a case-by-case basis. In any case, any CV compensation that is applied to the generated final reference image may be performed as described further above.

The computer subsystem is further configured for generating a difference image by comparing the test image to the final reference image. For example, as shown in step 408 of FIG. 4, the computer subsystem may be configured to generate Difference Image 1 by subtracting Final Reference Image 1 from the Test image. Generating the difference image may be performed in any suitable manner known in the art. In particular, subtracting the final reference image from the test image may be performed in any suitable manner.

The computer subsystem is further configured for detecting defects in the test image by applying a defect detection method to the difference image. For example, as shown in step 412 of FIG. 4, the computer subsystem may be configured for performing detection using Difference Image 1 as input. In perhaps the most simple implementation, detecting the defects in step 412 may include comparing the difference image pixels or signals to a threshold and determining that any pixels or signals having a value above the threshold are defects and that any pixels or signals not having a value above the threshold are not defects. However, many more complicated defect detection methods have been developed in the art and may be used in step 412. In other words, the difference images generated by the embodiments described herein may be used for defect detection in the same manner that any other difference images are used for defect detection. In addition, the defect detection method may include any defect detection method known in the art such as an MCAT defect detection method, which is a defect detection algorithm used by some inspection systems commercially available from KLA, or another suitable commercially available defect detection method and/or algorithm. The output of this step may be final defect result 418 in the case of a single detection method.

The embodiments described herein may be configured for both single detection and double detection modes. Both detection modes may be based on multiple reference generation performed as described herein. In a single detection mode, only one final reference image is needed and used to generate a single difference image for each test image. Defect detection is then performed with the single difference image. More than one final reference image may be generated for any one test image and used for double detection. For example, the embodiments described herein enable double detection for NPA defect detection, which is not supported in currently used NPA defect detection methods. To enable double detection, two final reference images instead of one may be generated from the candidate reference images.

Several embodiments can be configured and used for such defect detection. In one embodiment, the computer subsystem is configured for repeating the selecting and combining to thereby generate an additional final reference image. For example, using the steps described herein, two equally clean but different reference images can be constructed based on three candidate reference images. In this manner, the embodiments described herein advantageously provide a double reference generation method for nuisance reduction.

Figure 4:
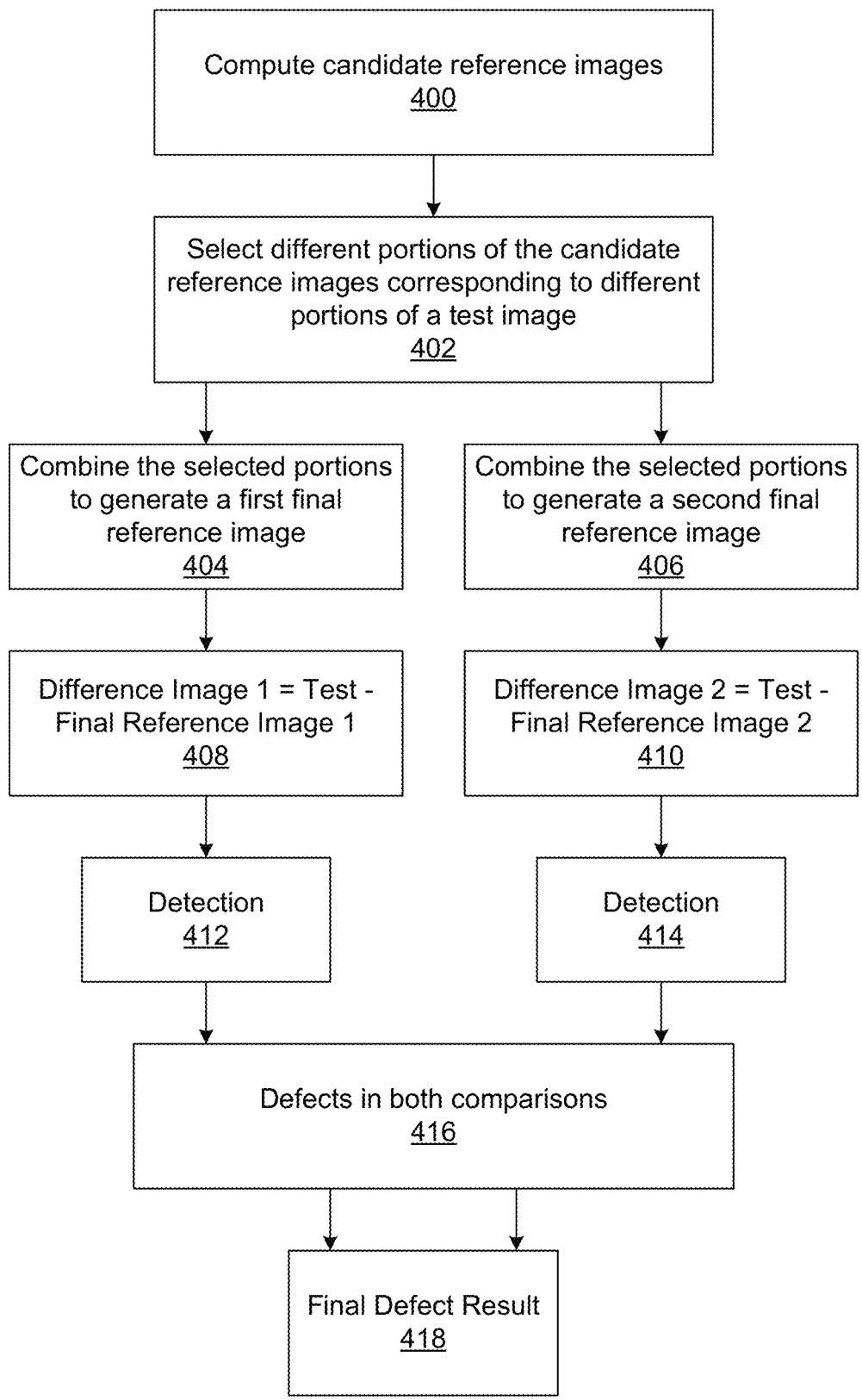
FIG. 4 is a flow chart illustrating one embodiment of steps that may be performed for detecting defects on a specimen.

In one such embodiment, step 402 shown in FIG. 4 may be performed twice, once to select different portions of the candidate reference images for a first final reference image and another time to select other different portions of the candidate reference images for a second final reference image. Both of the selecting steps may be performed in one or more of the ways described above. In addition, the selecting step performed for each final reference image may be performed in the same or different way. As shown in step 406 of FIG. 4, the computer subsystem may combine the selected portions to generate a second final reference image. In particular, the selecting steps may produce a first set of selected portions that are used to generate a first final reference image and a second set of selected portions that are used to generate a second final reference image. The first and seconds sets of selected portions should include at least some different portions for any one portion of the test image otherwise the second final reference image is redundant. The first set of selected portions may be used to generate a first final reference image in step 404, and the second set of selected portions may be used to generate a second final reference image in step 406. The combining steps may otherwise be performed as described further herein.

In another embodiment, the computer subsystem is configured for selecting one of the first and second candidate reference images as an additional final reference image. For example, rather than generating two final reference images, each from a combination of different portions of different candidate reference images, one final reference image may be generated in that manner while another final reference image may simply be one of the candidate reference images. The best candidate reference image for use as the second final reference image may be selected as described further herein.

In a further embodiment, the computer subsystem is configured for selecting an additional candidate reference image as an additional final reference image. For example, additional candidate reference images may be available and/or specifically generated for consideration as a second final reference image. In one such example, the computer subsystem may be configured to acquire an image of a neighboring care area, either in the same die or a neighboring die. In this manner, such an image may not be a CR in that it may not be generated by combining two or more images. Instead, such an image may simply be the image that is generated by the inspection subsystem, possibly with one or more image processing steps performed thereon such as CV compensation, high pass filtering, and the like. Such an image may then be compared to the test image and/or one or more of the other candidate reference images to determine which one or two of the images are the best for defect detection. In any case, multiple candidate reference images may be generated for each test image, and the computer subsystem may select the best two reference images, not the best one, to be used for defect detection.

In another such example, the two final reference images may come from a selection process performed on the three generated candidate reference images. In particular, the best top two candidate reference images may be selected for double detection. Special attention can been paid so that both of the two selected reference images have good quality. For example, at the corner area of cell regions such as those shown in FIG. 5, the best reference image usually comes from the third reference image (e.g., a die-to-die operation type reference). The next best reference image may have much degraded quality at the corner area (i.e., it may be much different than the same area in the test image). In this case, the computer subsystem may force the selected two reference images for double detection to be the same type, meaning they all come from the best multi-die candidate reference image. In this manner, the embodiments described herein can ensure that the double detection has relatively high sensitivity.

Double final reference image generation may activate double detection in NPA defect detection. In any of the above embodiments, the computer subsystem may be configured for generating an additional difference image by comparing the test image to the additional final reference image and detecting defects in the test image by applying the defect detection method to the additional difference image. Regardless of which additional final reference image is generated and selected for use in the embodiments described herein, the computer subsystem may also generate Difference Image 2 by subtracting Final Reference Image 2 from the test image, as shown in step 410 of FIG. 4, and performing detection, as shown in step 414 using Difference Image 2 as input. These steps may be performed as described further herein.

The defect detection method determines that a defect is present at a location in the test image only when the defect detection method detects the defect at corresponding locations in the difference image and the additional difference image. For example, as shown in step 416 of FIG. 4, the defects detected by both detection steps 412 and 414 may be combined into one set of defects detected in both comparisons. The combined set of defects may then be analyzed to generate final defect result 418 shown in FIG. 4, which includes only defects detected at corresponding locations in the first and second difference images. In particular, the computer subsystem may compare defects detected in the difference images and any commonalities among the defects will be designated as real defects, and any differences between the defects will be designated as nuisances or artifacts. The computer subsystem may compare the results of the different defect detection steps performed with different difference images in any suitable manner so that the results at corresponding locations in the different difference images can be compared to thereby determine if a detected defect is a real defect or an artifact or nuisance. In this manner, the defect detection method is preferably configured so that a defect is only reported when a defect is detected at the same location or the same pixel in the two difference images. As such, the embodiments described herein can perform double detection that will help suppress nuisance detection. In other words, CR double detection can minimize the impact of unique nuisances or artifacts in reference images on defect detection results by arbitration.

The embodiments described herein also advantageously provide a new segment-based detection strategy that suppresses nuisance detection. In one embodiment, the computer subsystem is configured for dividing the images corresponding to a care area for a cell region on the specimen into the test image corresponding to a test cell and the two or more other images corresponding to two or more other cells neighboring the test cell, and the defect detection method divides the care area into different segments of the cell region and separately detects defects in each of the different segments. In this manner, the embodiments described herein may add image segmentation to cluster different locations into separate detection flows. The computer subsystem may divide the whole image into different regions, and the dimensions of each region may be decided based on nuisance differences. In the detection phase, each region can have independent parameters to adapt to different nuisance control requirements.

Figure 7:
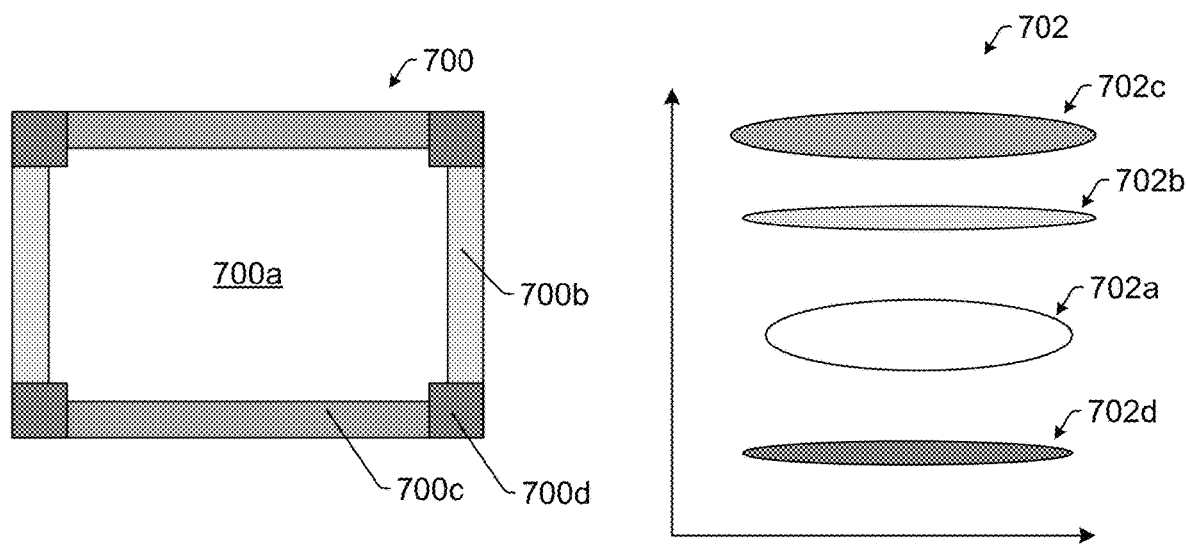
FIG. 7 is a schematic diagram illustrating a plan view of an embodiment of a care area divided into different segments and a plot showing one embodiment of separately detecting defects in each of the different segments.

In one embodiment, the different segments include a first segment for top and bottom edges of the cell region, a second segment for left and right edges of the cell region, a third segment for a center of the cell region, and a fourth segment for corners of the cell region. One such embodiment of segment-based detection to improve nuisance reduction is shown in FIG. 7. In this embodiment, a whole image for care area 700 is separated into different segments. The segments include center segment 700a, left/right edge segments 700b, top/bottom edge segments 700c, and corner segments 700d. Each instance of this care area on the specimen may be divided into these four segments.

Each of the steps described herein may be performed for each of the segments either collectively or independently. For example, for a test image that corresponds to the entire care area, a final reference image may be generated as described herein and a difference image may be generated for the entire care area by subtracting the final reference image from the test image. The difference image may then be divided into the corresponding portions for each of the different segments, and defect detection may be separately performed for each of the portions of the difference image.

In one such example, in plot 702 shown in FIG. 7, a different noise cloud may be separately and independently generated for each different segment in the care area. In particular, noise cloud 702a may be generated for only center segment 700a, noise cloud 702b may be generated for only left/right edge segments 700b, noise cloud 702c may be generated for only top/bottom edge segments 700c, and noise cloud 702d may be generated for only corner segments 700d. Defect detection may then be separately performed for each noise cloud. In the detection phase, each region may have independent parameters to adapt to different nuisance control requirements. In this manner, a separate noise cloud may be formed for each segment with individual parameters to strike the best balance between DOI detection and nuisance suppression.

A multi-noise cloud plot such as that shown in FIG. 7 may be generated for each test image. In other words, the noise clouds shown in plot 702 are for only a single test image, and similar plots may be generated for other test images. In addition, the noise clouds shown in plot 702 are based on the difference image generated for one test image. A separate noise cloud plot may be generated for another difference image generated for the same test image (as in double detection in which multiple difference images are generated for a single test image).

Any of the computer subsystems described herein may generate inspection results, which may include the results of any of the steps described herein. The inspection results may include information for the detected defects such as defect IDs, location, etc., of the bounding boxes of the detected defects, sizes, detection scores, information about defect classifications such as class labels or IDs, etc., or any such suitable information known in the art. The results for the defects may be generated by the computer subsystem in any suitable manner. The results for the defects may have any suitable form or format such as a standard file type. The computer subsystem may generate the results and store the results such that the results can be used by the computer subsystem and/or another system or method to perform one or more functions for the specimen or another specimen of the same type.

The computer subsystem may be configured for storing the information for the detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the inspection on the specimen may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem may be configured to determine one or more changes to a process that was or will be performed on a specimen inspected as described herein based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or inspection subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of advantages over other methods and systems for detecting defects on a specimen. For example, the embodiments described herein provide better reference generation to reduce inspection noise when color variation exists and provide a new detection strategy to further suppress nuisances. In addition, the embodiments described herein provide a new reference generation method and detection strategy at non-pattern regions, which provide better difference image generation with less and smaller noise and thus higher sensitivity when color variation exists and stronger capability of nuisance suppression.

The advantages described above are enabled by a number of important new features of the embodiments described herein. For example, the embodiments described herein enable a new freedom to generate two or even three candidate reference images simultaneously for any one test image. This capability is new for both non-resolvable device patterned features and resolvable patterns. For resolvable repeating cell regions, unlike the embodiments described herein, currently used inspection systems and methods can usually only generate a reference image along the repeating direction. The multi-candidate reference image mixing process described herein may also be useful for inspecting non-resolvable patterned areas as well as other types of areas. In addition, the embodiments described herein support both single detection using the best one final reference image as well as double detection using the best two reference images generated in any manner described herein. The embodiments described herein are also not particular to any one defect detection method and may be used to generate input to any suitable defect detection method known in the art.

Each of the embodiments of the system described above may be combined together into one single embodiment. In other words, unless otherwise noted herein, none of the system embodiments are mutually exclusive of any other system embodiments.

Another embodiment relates to a computer-implemented method for detecting defects on a specimen. The method includes acquiring images for a specimen generated by an inspection subsystem including a test image and two or more other images corresponding to the test image. The method also includes computing first and second reference images from different combinations of at least two of the test image and the two or more other images (as in step 400 shown in FIG. 4). The method also includes selecting at least a portion of the first candidate reference image corresponding to a first portion of the test image and a portion of the second candidate reference image corresponding to a second portion of the test image (as in step 402 of FIG. 4). In addition, the method includes combining the selected portions of the first and second candidate reference images without modifying the selected portions of the first and second candidate reference images to thereby generate a final reference image (as in step 404 of FIG. 4). The method also includes generating a difference image by comparing the test image to the final reference image (as in step 408 in FIG. 4). In addition, the method includes detecting defects in the test image by applying a defect detection method to the difference image (as in step 412 shown in FIG. 4). The acquiring, computing, selecting, combining, generating, and detecting steps are performed by a computer subsystem coupled to the inspection subsystem, which may be configured according to any of the embodiments described herein.

Each of the steps of the method may be performed as described further herein. The method may also include any other step(s) that can be performed by the inspection subsystem and/or computer subsystem described herein. In addition, the method described above may be performed by any of the system embodiments described herein.

Figure 8:
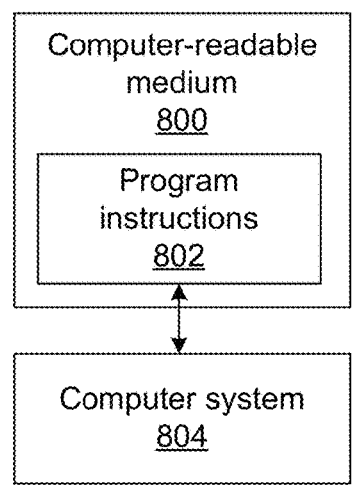
FIG. 8 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a specimen. One such embodiment is shown in FIG. 8. In particular, as shown in FIG. 8, non-transitory computer-readable medium 800 includes program instructions 802 executable on computer system 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for detecting defects on a specimen, comprising:
an inspection subsystem configured for generating images for a specimen including a test image and two or more other images corresponding to the test image; and
a computer subsystem configured for:
computing first and second candidate reference images from different combinations of at least two of the test image and the two or more other images;
selecting at least a portion of the first candidate reference image corresponding to a first portion of the test image and a portion of the second candidate reference image corresponding to a second portion of the test image;
combining the selected portions of the first and second candidate reference images without modifying the selected portions of the first and second candidate reference images to thereby generate a final reference image;
generating a difference image by comparing the test image to the final reference image; and
detecting defects in the test image by applying a defect detection method to the difference image.

2. The system of claim 1, wherein the test image and the two or more other images are generated in areas on the specimen comprising only non-resolvable, repeating device patterns.

3. The system of claim 1, wherein the computer subsystem is further configured for dividing the images corresponding to a care area on the specimen into the test image corresponding to a test cell and the two or more other images corresponding to two or more other cells neighboring the test cell.

4. The system of claim 1, wherein prior to said computing, the computer subsystem is further configured for applying a color variation compensation to the test image and the two or more other images.

5. The system of claim 1, wherein subsequent to said combining, the computer subsystem is further configured for applying a color variation compensation to the results of said combining.

6. The system of claim 1, wherein a first of the different combinations of the at least two of the test image and the two or more other images used to compute the first candidate reference image comprises a portion of the images generated in only the x-direction across the specimen.

7. The system of claim 6, wherein a second of the different combinations of the at least two of the test image and the two or more other images used to compute the second candidate reference image comprises an additional portion of the images generated in only the y-direction across the specimen.

8. The system of claim 1, wherein one of the different combinations of the at least two of the test image and the two or more other images used to compute one of the first and second candidate reference images comprises all of the images generated in two or more dies on the specimen in a job of the images.

9. The system of claim 1, wherein the computer subsystem is further configured for computing a third candidate reference image from the different combinations and selecting at least a portion of the third candidate reference image corresponding to a third portion of the test image, and wherein said combining comprises combining the selected portions of the first, second, and third candidate reference images without modifying the selected portions of the first, second, and third candidate reference images to thereby generate the final reference image.

10. The system of claim 1, wherein said selecting comprises identifying which portions of the first and second candidate reference images best match different portions of the test image.

11. The system of claim 1, wherein said selecting comprises identifying which portions of the first and second candidate reference images best match corresponding portions of the test image.

12. The system of claim 1, wherein the computer subsystem is further configured for repeating the selecting and combining to thereby generate an additional final reference image, generating an additional difference image by comparing the test image to the additional final reference image, and detecting defects in the test image by applying the defect detection method to the additional difference image, and wherein the defect detection method determines that a defect is present at a location in the test image only when the defect detection method detects the defect at corresponding locations in the difference image and the additional difference image.

13. The system of claim 1, wherein the computer subsystem is further configured for selecting one of the first and second candidate reference images as an additional final reference image, generating an additional difference image by comparing the test image to the additional final reference image, and detecting defects in the test image by applying the defect detection method to the additional difference image, and wherein the defect detection method determines that a defect is present at a location in the test image only when the defect detection method detects the defect at corresponding locations in the difference image and the additional difference image.

14. The system of claim 1, wherein the computer subsystem is further configured for selecting an additional candidate reference image as an additional final reference image, generating an additional difference image by comparing the test image to the additional final reference image, and detecting defects in the test image by applying the defect detection method to the additional difference image, and wherein the defect detection method determines that a defect is present at a location in the test image only when the defect detection method detects the defect at corresponding locations in the difference image and the additional difference image.

15. The system of claim 1, wherein the computer subsystem is further configured for dividing the images corresponding to a care area for a cell region on the specimen into the test image corresponding to a test cell and the two or more other images corresponding to two or more other cells neighboring the test cell, and wherein the defect detection method divides the care area into different segments of the cell region and separately detects defects in each of the different segments.

16. The system of claim 15, wherein the different segments comprise a first segment for top and bottom edges of the cell region, a second segment for left and right edges of the cell region, a third segment for a center of the cell region, and a fourth segment for corners of the cell region.

17. The system of claim 1, wherein the inspection subsystem is further configured as a light-based inspection subsystem.

18. The system of claim 1, wherein the inspection subsystem is further configured as an electron beam based inspection subsystem.

19. A non-transitory computer-readable medium, storing program instructions executable on a computer system for performing a computer-implemented method for detecting defects on a specimen, wherein the computer-implemented method comprises:
  acquiring images for a specimen generated by an inspection subsystem including a test image and two or more other images corresponding to the test image;
  computing first and second candidate reference images from different combinations of at least two of the test image and the two or more other images;
  selecting at least a portion of the first candidate reference image corresponding to a first portion of the test image and a portion of the second candidate reference image corresponding to a second portion of the test image;
  combining the selected portions of the first and second candidate reference images without modifying the selected portions of the first and second candidate reference images to thereby generate a final reference image;
  generating a difference image by comparing the test image to the final reference image; and
  detecting defects in the test image by applying a defect detection method to the difference image.

20. A computer-implemented method for detecting defects on a specimen, comprising:
  acquiring images for a specimen generated by an inspection subsystem including a test image and two or more other images corresponding to the test image;
  computing first and second candidate reference images from different combinations of at least two of the test image and the two or more other images;
  selecting at least a portion of the first candidate reference image corresponding to a first portion of the test image and a portion of the second candidate reference image corresponding to a second portion of the test image;
  combining the selected portions of the first and second candidate reference images without modifying the selected portions of the first and second candidate reference images to thereby generate a final reference image;
  generating a difference image by comparing the test image to the final reference image; and
  detecting defects in the test image by applying a defect detection method to the difference image, wherein said acquiring, computing, selecting, combining, generating, and detecting are performed by a computer subsystem coupled to the inspection subsystem.

* * * * *